United States Patent [19]

Cleland

[11] 4,027,568

[45] June 7, 1977

[54] REPLACEABLE SURFACE BAND WHEEL

[75] Inventor: Charles E. Cleland, Naples, Fla.

[73] Assignee: Continental Machines, Inc., Savage, Minn.

[22] Filed: May 24, 1976

[21] Appl. No.: 689,512

[52] U.S. Cl. .................................. 83/788; 83/820; 29/121.4; 74/230.5

[51] Int. Cl.² .................. B23D 55/06; B27B 13/06

[58] Field of Search ............ 83/788, 820; 29/121.4; 74/230.5

[56] References Cited

UNITED STATES PATENTS

| 670,712 | 3/1901 | Kuhn | 74/230.5 X |
|---|---|---|---|
| 2,115,217 | 4/1938 | Sandorff | 29/121.4 X |
| 3,713,348 | 1/1930 | Conrad et al. | 74/230.5 X |

FOREIGN PATENTS OR APPLICATIONS

| 273,476 | 2/1951 | Switzerland | 83/788 |

Primary Examiner—J. M. Meister
Attorney, Agent, or Firm—Kirkland & Ellis

[57] ABSTRACT

For band saw machines, a replaceable surface band wheel is disclosed wherein a helical groove is machined in the peripheral surface of a substantially conventional disk-shaped band wheel of the flanged type to extend from the rear face flange to the non-flanged front face of the band wheel. A wire is wound about the peripheral surface such that the wraps of wire lie in the helical groove and extend radially above the peripheral surface. The wire, so placed, forms an inexpensive replaceable cutting band contact surface. The depth and pitch of the helical groove and the wire size are selected to insure that the wire extends partially above the peripheral surface and to provide space between adjacent wraps of wire so that during cutting operations cutting chips and scale which might otherwise loosen the wire or cause abrasive wear to the band wheel peripheral surface are forced temporarily into the spaces between the wraps of wire. The inexpensive wire is secured on the peripheral surface at its first end by an anchor arrangement and is loosely secured at its second end by a flange. Because of the loosely held second end and the helical groove, the wire tightens itself around the band wheel under the action of the tensioned cutting band riding on the cutting band contact surface. Only the wire surface experiences wear resulting from cutting band contact, abrasive chip action, and slippage between the cutting band and the band wheel. Following excessive wear, the inexpensive wire is readily replaced to completely restore the cutting band contact surface thereby eliminating heretofore required precise machine and assembly techniques. A removable flange arrangement simplifies wire replacement and allows renewal of the flange.

41 Claims, 10 Drawing Figures

REPLACEABLE SURFACE BAND WHEEL

BACKGROUND OF THE INVENTION

1. Field of the Invention

The present invention relates to band wheels for band saws and more particularly to band wheels of the flanged type with replaceable wear surfaces.

2. Description of the Prior Art

In band saw machines of the type for which the present invention is intended, the cutting band or blade is trained in tension around the peripheral surfaces of two or more spaced band wheels which rotate about substantially parallel axes. Band wheels for such machines are conventionally either crowned wheels or flanged wheels and the flanged wheels have either resilient tires or metal tires. Resilient tire wheels of both the crowned and flanged type have a distinct disadvantage in that, on heavy duty, high production band saw machines where cutting fluids are used, the cutting band will slip off the resilient tire and off the band wheel when subjected to high tension and heavy feed forces. Because of this severe limitation, heavy duty, high production band saw machines have heretofore employed band wheels with metal tires, the most satisfactory but most expensive of which are hardened metal tires.

In the use of band saw machines having flanged band wheels with metal tires, chips and scale from cutting operations frequently lodge between the cutting band and the metal tire causing abrasive wear on the tire. Since the concentration of chips and scale is greater nearer the cutting edge of the cutting band, the abrasive wear on the metal tire is more severe near the non-flanged front face, causing a taper of the cutting band contact surface. More rapid wear of the metal tire occurs if the feed is too great for the material being cut, causing the cutting band to stick in the workpiece and slip on the powered band wheel while the powered band wheel continues to rotate. This wear of the metal tires of band wheels, in heavy duty high production type band saw machines, is a significant and troublesome problem.

When the surface of the metal tire becomes worn and tapered as a result of abrasion and wear due to slippage, uneven stresses occur in the cutting band while it is trained under high tension over and caused to conform to the metal tire surface. These uneven stresses have a detrimental effect on the fatigue life or flex life of the cutting band. Consequently, it is imperative that the cutting band contact surface be periodically restored or replaced. It is therefore desirable that the cutting band contact surface be readily replaceable.

There have been numerous attempts to make replaceable cutting band contact surfaces for flanged band wheels with metal contact surfaces or tires. These attempts include the use of hardened steel hoops which must be machined to close tolerences and pressed on the band wheel peripheral surface or installed by conventional heat shrinking techniques. The costs and difficulty involved in production of band wheels and hardened steel hoops by precise machine operations and the fitting of such hardened steel hoops by the techniques mentioned are a major concern. Moreover, these and other similar techniques, while avoiding the need for replacement of the entire band wheel, are unsatisfactory in that special equipment is required for manufacture and replacement, and the band wheel generally must be removed from the machine users plant for replacement of the cutting band contact surface. Thus, existing solutions are neither acceptable nor economical and are unsatisfactory for replacement service in the machine users plant.

It would therefore be an important and desirable advance in the art to provide a band wheel having a readily replaceable and improved cutting band contact surface which is suited for heavy duty, high production applications.

In the course of band saw machine operation, wear also occurs on the front surface of the flange of the band wheel where the cutting band contacts the flange. While this wear is thought to have little affect on the fatigue life or flex life of the cutting band, this flange surface often plays an important part in alignment and it would therefore be a desirable advance in the art to provide a band wheel with a readily replaceable flange.

BRIEF DESCRIPTION OF THE INVENTION

The present invention relates to a band wheel with a readily replaceable, inexpensive, self-tightening wire cutting band contact surface suited for heavy duty, high production band saw machines. The band wheel is intended for use in band saw machines of the type in which an endless cutting band is trained in tension around the peripheral surfaces of spaced band wheels. Once such spaced band whees, the back edge of the cutting band acts against a flange extending radially outward from the rear face of each band wheel and the cutting edge of the cutting band overhangs the non-flanged front face of each band wheel.

The replaceable surface band wheel of the present invention comprises a disk-shaped body having an essentially cylindrical peripheral surface wherein at least one helical groove is formed. A separate elongated member having first and second ends is provided for each helical groove in the peripheral surface, the number of elongated members corresponding to the number of helical grooves. One elongated member is positioned on the peripheral surface of the band wheel so as to lie in each such helical groove and to extend partially above the peripheral surface. Each elongated member is held in place on the peripheral surface by its first end which is secured by an anchoring arrangement and by its second end which is loosely held by a securing means. It is preferred that there be one anchoring arrangement for each helical groove.

The helical groove or grooves, as the case may be, in the peripheral surface extend from the front face of the substantially conventional disk-shaped band wheel to the rear face. The elongated members wound about the peripheral surface of the band wheel form a cutting band contact surface sometimes referred to as a "tire".

The cutting band is trained in tension about the peripheral surface of the band wheel such that the elongated flat face of the cutting band tangetially engages and rides on the elongated member or members, as the case may be, with the rear edge of the cutting band acting against the flange and the cutting edge overhanging the nonflanged front face of the band wheel. Under the action of the tensioned cutting band, the inexpensive elongated members (preferably lengths of wire) are self-tightening around the band wheel. Each elongated member must have tensile strength sufficient to withstand forces exerted on the peripheral surface of the band wheel by the cutting band during slippage. The flange is preferably removable from the body of the band wheel to facilitate removal and replacement of each elongated member.

In the preferred embodiment, the at least one helical groove is a single V-shaped helical groove and the elongated member is a round wire with a high tensile strength such as "piano wire". The depth and pitch of the helical groove, and the wire are selected to insure that the wire protrudes radially above the peripheral surface of the band wheel and to provide space between adjacent wraps of wire.

The helical groove is chosen between "left hand" and "right hand" on the basis of the direction of band wheel rotation to insure that the first end of the wire, which is connected to the anchor arrangement, engages the cutting band before other sections of wire during rotation so that any slack which may exist in the wraps of wire is forced to progress along the helical groove toward and under the flange. The loose restraint imposed on the second end of the wire by the flange and the helical groove of the present invention make the present inexpensive cutting band contact surface self tightening around the band wheel, thereby eliminating the need for precise machinery and time consuming assembly techniques and reducing band wheel costs.

In operation, the cutting band contacts only the wraps of wire making up the replaceable tire surface. The action of the tensioned cutting band draws the wire into the helical groove and drives slack in the wire toward and under the flange, thereby tightening the wire around the band wheel peripheral surface. Abrasive wear is reduced or eliminated because chips and scale are temporarily pushed by the cutting band into the spaces between adjacent wraps of wire and allowed to drop from the spaces during the remaining portion of the band wheel rotation. Thus, abrasive wear and wear due to slippage are both restricted to the wire surface which can be replaced readily and inexpensively.

The replaceable wire surface of the band wheel of the present invention exhibits the advantageous characteristics of solid metal or metallic tire band wheels and is suited for use in the presence of cutting fluids of high lubricity and in heavy duty, high production applications. In addition, the present invention is advantageous in that, in addition to the wire surface, the band wheel flange can be easily and inexpensively replaced in the event of damage or excessive wear.

Thus, it is a primary object of the present invention to provide a band wheel with a replaceable, inexpensive, improved cutting band contact surface suited for heavy duty, high production applications.

It is a further object of the present invention to provide a band wheel with a self-tightening wire cutting band contact surface which requires no precise machine or assembly techniques for production, removal or replacement.

Yet another object of the present invention is to provide a cutting band contact surface with peripheral spaces for receiving chips and scale so as to reduce abrasive wear.

Still another object of the present invention is to provide a helical groove-wire surface band wheel wherein abrasive wear and wear due to slippage affects only the inexpensive replaceable wire surface.

It is another object of the present invention to provide a flange for loosely securing one end of wire of the inexpensive, replaceable wire surface near the rear face of the band wheel and an anchor arrangement for securing the other end of the wire at the front face of the band wheel.

It is a further object of the present invention to provide a replaceable wire cutting band contact surface comprising an inexpensive wire that tightens itself in a helical groove around the band wheel surface under the action of the tensioned cutting band, thereby reducing costs and eliminating heretofore required precise machine and assembly techniques.

These and other objects, advantages, and features of the present invention will hereinafter appear from the complete description of the preferred embodiment of the present invention which, for purposes of illustration, but not for limitation, is illustrated in the accompanying drawings.

DETAILED DESCRIPTION OF THE PREFERRED EMBODIMENT

Figure 1:
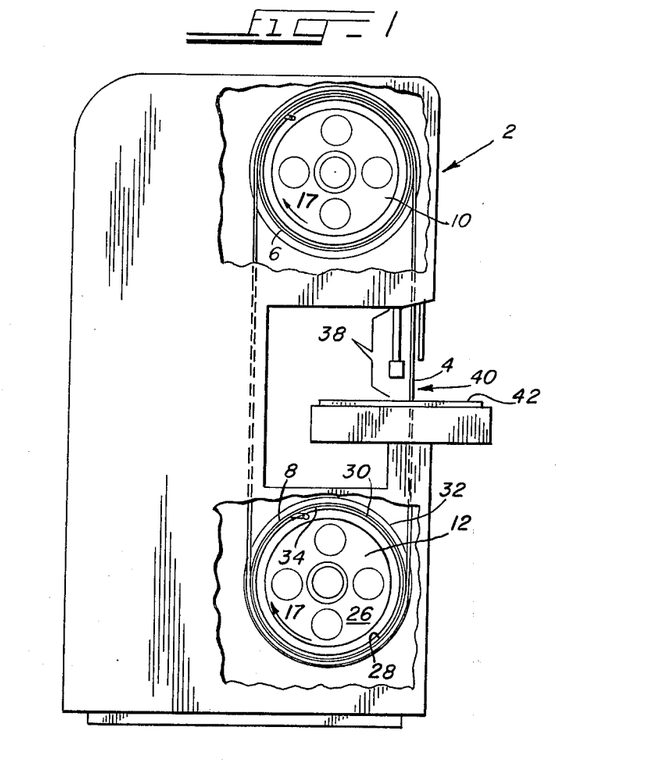
FIG. 1 is a left elevation view of a band saw with cut away sections revealing the band wheel arrangement.
Figure 2:
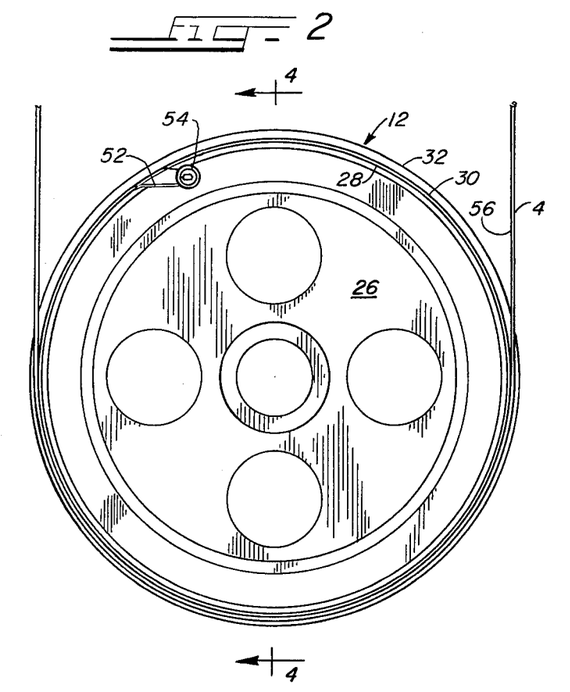
FIG. 2 is a left elevation view of a band wheel in accordance with the present invention.
Figure 3:
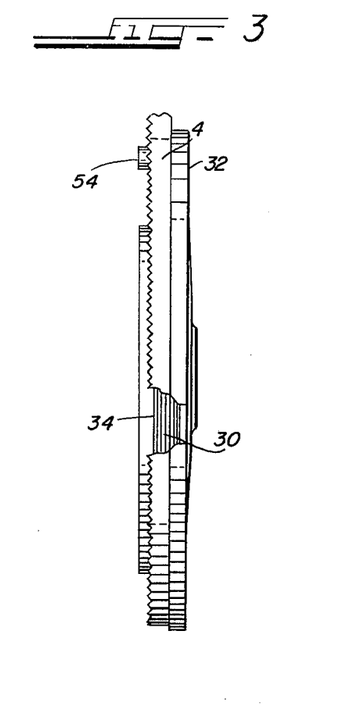
FIG. 3 is a front view of the band wheel of FIG. 2.
Figure 4:
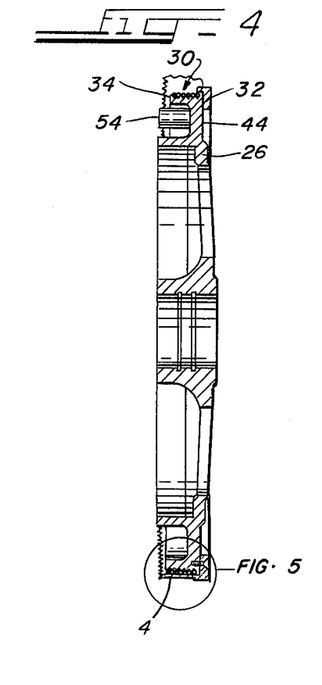
FIG. 4 is a sectional view of the band wheel of FIG. 2 taken along line 4—4.

With reference to FIG. 1, the replaceable surface band wheel of the present invention is intended for use in heavy duty, high production band saw machines generally of the type shown as band saw machine 2 wherein cutting band 4 is trained in tension about the peripheral cutting band contact surfaces 6 and 8 respectively of upstream band wheel 10 and downstream band wheel 12.

Both upstream band wheel 10 and downstream band wheel 12 of band saw machine 2 are replaceable surface band wheels in accordance with the present invention. Downstream band wheel 12, (FIG. 1) is identical to upstream band wheel 10, and generally comprises disk-shaped body 26 having a peripheral surface 28 bounded by flange 32 and non-flanged front face 34. Band wheel 12 features a replaceable wire surface 30, in accordance with the present invention, which contacts cutting band 4 during rotation of band wheel 12. Replaceable surface band wheels in accordance with the present invention are preferably employed in both upstream and downstream positions and have been found to function equally as well for the powered band wheel and the idler band wheel.

During cutting operations both upstream band wheel 10 and downstream band wheel 12 turn in a clockwise direction (indicated by arrows 17 in FIG. 1) drawing the cutting stretch 38 of cutting band 4 downward through work area 40 to perform cuts on a work piece (not shown) placed on work table 42 in a conventional manner.

Referring to FIGS. 2 through 10, and more particularly to FIGS. 2 through 6, (carrying forth consistent numbers from FIG. 1) band wheel 12, in accordance with the present invention, more specifically comprises substantially conventional disk-shaped body 26 having a peripheral surface 28, a flange 32 extending radially outward at the rear edge 44 and a wire surface 30. Wire surface 30 comprises wraps of wire 46 (of a type, size, and tensile strength determined as hereinafter specified). The wire 46 is wound about the peripheral surface 28 to lie in helical groove 48 (of a pitch, direction and depth determined as hereinafter specified) to form wire surface 39. Helical groove 48 is machined in peripheral surface 28 to extend from non-flange front face 34 of band wheel 12 to rear edge 44. Wire 46 is secured in helical groove 48 at its first end 52 by anchor arrangement 54 and is loosely held in helical groove 48 at its second end 50 by flange 32 in the manner hereinafter described in more detail.

Figure 5:
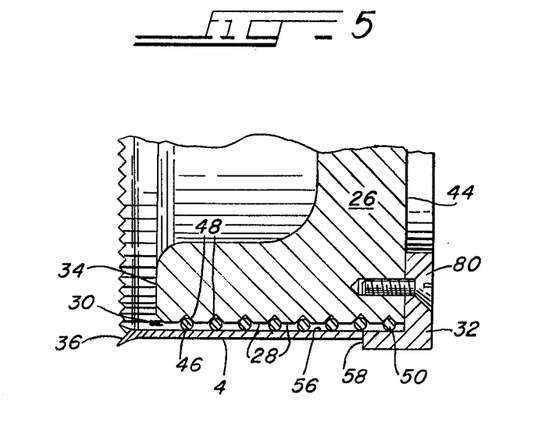
FIG. 5 is an enlarged fragmentary view of the portion of the cross section of FIG. 4 within the circle FIG. 5.

The cutting band 4 is trained in tension about spaced band wheels 10 and 12 (see FIG. 1) such that the elongated flat surface 56 of cutting band 4 tangentially engages the wraps of wire 46 of wire surface 30, thus avoiding direct contact between band 4 and peripheral surface 28 of disk-shaped body 26 (see FIG. 5). Thus, abrasion due to the action of chips and scale and wear due to slippage affect only wire surface 30 which is easily replaced in the manner hereinbelow described in detail.

During cutting operations, cutting band 4 is urged against front wall 58 of flange 32 while the cutting edge 36 of cutting band 4 overhangs non-flanged front face 34 of band wheel 12. The wire 46 is tightened in helical groove 48 around peripheral surface 28 by the action of tensioned cutting band 4 which urges the second end 50 and slack in wire 46 toward and further under flange 32 as band wheel 12 rotates as explained more fully below.

Referring to FIGS. 7, 8, 9 and 10, helical groove 48 of the preferred embodiment is V-shaped, having a pitch and depth selected to provide a multiplicity of spaced circumferential excursions of helical groove 48 while leaving in tact segments 60 of peripheral surface 28 between adjacent circumferential excursions. The direction of helical groove 48 is selected based on the direction of rotation of band wheel 12, as viewed from non-flanged front face 34. Thus, for clockwise band wheel rotation, helical groove 48 is "lefthanded" (using conventional screw thread nomenclature) and for counterclockwise band wheel rotation, helical groove 48 is "righthanded". With the direction of helical groove 48 selected in this manner, any slack which may exist after installation or develop in wire 46 during operation will be forced, by the force exerted by cutting band 4 on wire surface 30, to progress along helical roove 48 from non-flanged front face 34 toward and eventually under flange 32. This removal of slack automatically tightens the wire 46 in helical groove 48 on the peripheral surface 28 after installation and during operation.

Wire 46 is preferably a round wire, such as precision brand superior quality "piano wire", and of a diameter matched to the depth and pitch of the V-shaped helical groove 48 to insure that the wraps of wire 46 extend radially above peripheral surface 28 while firmly entrenched in helical groove 48, and to insure that spaces 62 occur between the adjacent wraps of wire 46.

For heavy duty, high production applications, wire 46 must have a tensile strength sufficient to endure the frictional forces experienced during slippage between wire surface 30 and cutting band 4. This tensile strength can be determined simply when the cutting band tension and the co-efficient of friction between cutting band 4 and the wire surface 30 are known. For example, if the cutting band tension is 2000 pounds and the coefficient of friction is 0.3, the tensile strength of the wire is preferably over 600 pounds. It is preferred that the wire 46 employed be spring temper in hardness of approximately 50 Rockwell C Scale such as certain "music wire" or "piano wire".

The spaces 62 between adjacent wraps of wire 46 temporarily receive chips and scale trapped between the elongated surface 5 6 of cutting band 4 and peripheral surface 28, thereby avoiding the normal abrasion which would otherwise occur on peripheral surface 28 as a result of such chips and scale. The temporary receiving of chips in spaces 62 also prevents such chips and scale from loosening wire 46 from the peripheral surface 28 of band wheel 12.

Wire 46 is wound in helical groove 48 on the peripheral surface 28 of band wheel 12 starting at the non-flanged front face 34 where the first end 52 of wire 46 is secured in anchor arrangement 54 and then passed through a slot 64 provided in peripheral surface 28. The wraps of wire 46 are then wound around peripheral surface 28 toward rear edge 44. Flange 32 is preferably removable from the body 26 of band wheel 12 to simplify the winding of wire 46 in helical groove 48. The flange 32 is replaced after winding such that second end 50 of wire 46 is loosely secured in helical groove 48 under wall 82 of axially extending leg 84 of flange 32, thereby completing installation. Any slack existing in wire 46 after installation is automatically eliminated by the action of the tensioned cutting band 4 which tightens wire 46 on the peripheral surface 28 within helical groove 48 as band wheel 12 rotates. As previously explained, the action of cutting band 4 causes the second end 50 of wire 46 to advance within helical groove 48 further under axially extending leg 84, thereby tightening wire 46 and removing any slack.

Anchor arrangement 54 is preferably positioned adjacent slot 64 and below peripheral surface 28. Anchor arrangement 54 may be any means for securing the first end 52 of wire 46, but preferably comprises socket head cap screw 66 and threaded base 68. Wire 46 is secured by a clamping action between the head of cap screw 66 and threaded base 68. The first end 52 of wire 46 is preferably fashioned into an eyelet through which the threaded portion (not shown) of cap screw 66 is passed prior to threading cap screw 66 into threaded base 68 to clamp wire 46.

To achieve a desired cutting band contact surface diameter, the diameter of the peripheral surface 28 of disk-shaped body 26 must be such that the sum formed by adding two times the radial projection of wire surface 30 above peripheral surface 28 and the diameter of peripheral surface 28 equals the desired cutting band contact surface diameter. Of course, the radial projection of wire tire 30 above peripheral surface 28 is dependent upon the size (diameter) of wire 46 and the size and depth of helical groove 48.

Figure 7:
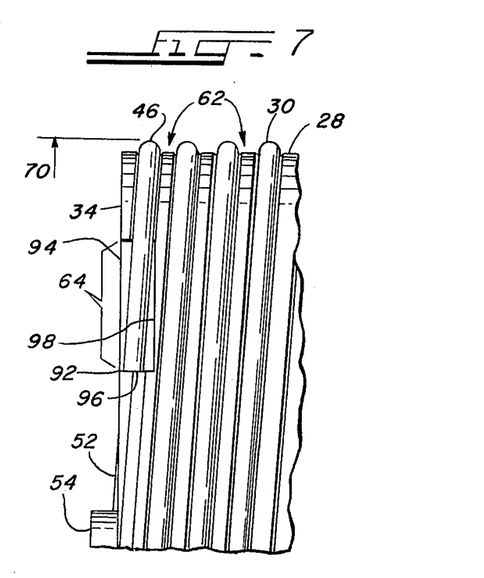
FIG. 7 is a fragmentary view of the band wheel, wire surface, and anchor arrangement of the present invention.
Figure 8:
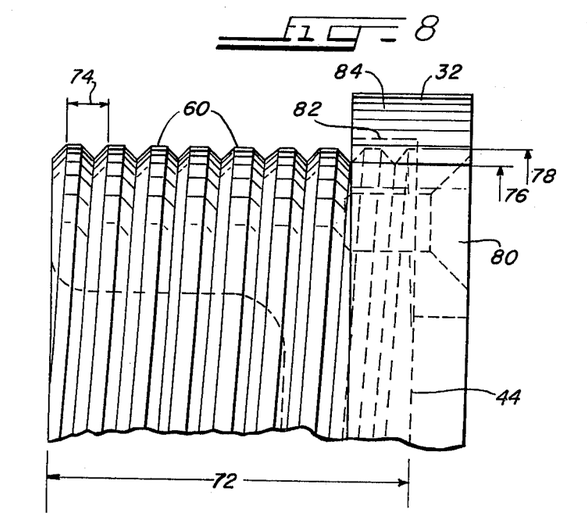
FIG. 8 is a fragmentary view of the peripheral surface and flange of a band wheel in accordance with the present invention without the replaceable wire surface.

Referring to FIGS. 7 and 8, for exemplary purposes, to fabricate a replaceable surface clockwise rotating band wheel with a cutting band contact surface diameter 70 of 16 inches, a peripheral surface 28 of 1 inch width 72 and a cutting band contact surface with a V-shaped helical groove 48 for receiving a wire surface 30 comprising wire 46 of round crossection, V-shaped helical groove 48 will comprise a left hand helical groove peferably with 45° side walls (i.e., the "V" of the V-shaped helical groove forms a 90° right angle bisected by the radial plane of band wheel 12). The V-shaped helical groove 48 will preferably have a pitch 74 of 0.135 (7.407 threads per inch) so that the 1 inch width 72 of peripheral surface 28 from non-flanged front face 34 to the rear edge 44 is traversed in from seven to eight circumferential excursions of helical groove 48.

The helical groove depth diameter 76 and the peripheral surface diameter 78 are selected, as previously indicated, with the diameter of the wire 46 employed to insure that wraps of wire 46 extend radially above peripheral surface 28 and so that the actual contact surface diameter 70 is within tolerable limits of that desired. For number 32 Gauge (0.090 dia.) wire, for example, peripheral surface diameter 78 is selected at 15.885 inches and helical groove 48 is machined to a depth diameter 76 of between 15.781 inches and 15.785 inches. For number 32 gauge music wire, a selected cutting band contact surface diameter 70 of 16 inches and a peripheral surface width 72 of 1 inch, approximately 400 inches of wire 46 are wound to lie in helical groove 48 about peripheral surface 28 from anchor arrangement 54 at the non-flanged front face 34 of body 26 to near the rear edge 44 of disk-shaped body 26.

Flange 32 (described more fully below with referred to FIGS. 8, 9, and 10) is preferably removable and is removed from body 26 during the installation of wire 46. The flange 32 is thereafter secured to the rear edge 44 by means of screws 80 with the wall 82 of axially extending leg 84 of flange 32 extending over and slidably securing the second end 50 and one or two wraps of wire 46 as previously explained. A small space (approximately 0.003 inches in the exemplary band wheel) is provided between wall 82 and the tangential surface of the wraps of wire 46 under axially extending leg 84 so that wire 46 is loosely held in helical groove 48. Loosely held in this manner, wire 46 is permitted to freely advance or recede along helical groove 48 and, as previously explained, is self-tightening under the action of the tensioned cutting band 4.

The length of wire 46 is selected so that a section of helical groove 48 between the second end 50 of wire 46 and the rear edge 44 of body 26 is left unoccupied at installation. Slack in wire 46 at installation which is caused to advance along helical groove 48 under the action of cutting band 4, in the manner previously described, ultimately passing under axially extending leg 84 to occupy a portion of that unoccupied section. Wire 46 is preferably pre-formed to the approximate peripheral surface diameter 78 of band wheel 12 to further facilitate winding during installation and replacement.

Figure 9:
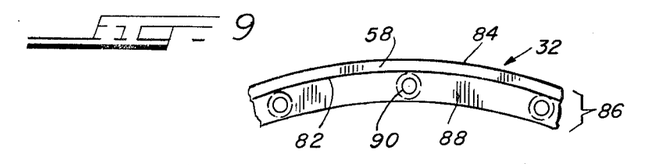
FIG. 9 is a fragmentary left elevation view of the flange in accordance with the present invention.
Figure 10:
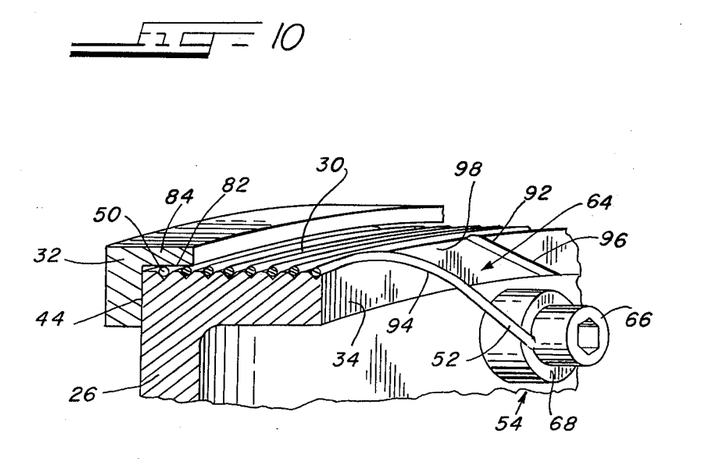
FIG. 10 is a fragmentary perspective view showing the anchor arrangement, and in cross section, a portion of the peripheral surface, replaceable wire surface and the flange illustrated in FIG. 9 in place.

Referring to FIGS. 8, 9, and 10, removable flange 32 comprises a ring 86 having an axially extending leg 84 with a cylindrical inner wall 82 and with a front wall 58 against which the rear edge of cutting band 4 acts during cutting operations. Flange 32 further comprises a radially extending body 88 having a series of spaced holes 90 through which screws 80 act to secure flange 32 to the rear edge 44.

Figure 6:
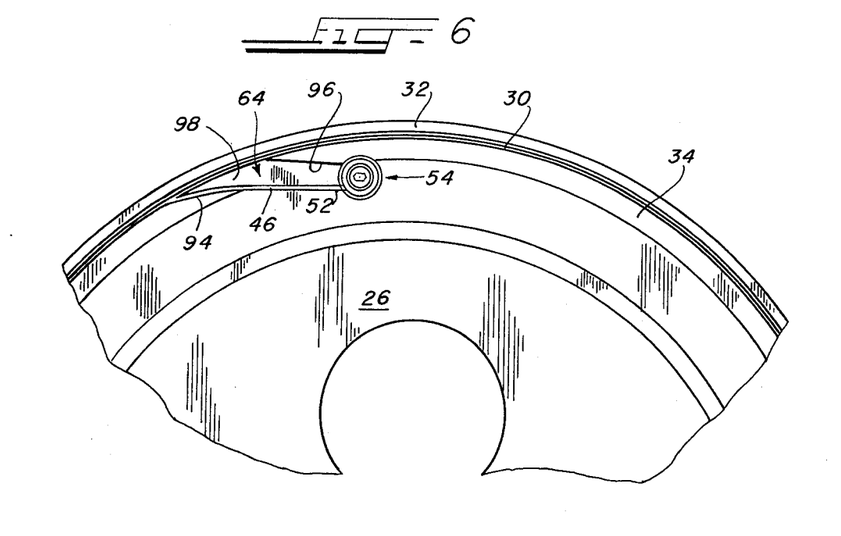
FIG. 6 is a fragmentary left elevation view of a portion of the band wheel of FIG. 2 with an anchor arrangement in accordance with the present invention.

Referring to FIGS. 6, 7, and 10, slot 64 is machined in peripheral surface 28 at the non-flanged front face 34 adjacent anchor arrangement 54. More specifically, slot 64 preferably begins at the point 92 where the first circumferential excursion of helical groove 48 just attains its symmetrical V-shape (the "V" has walls of equal shape and elevation) and extends along peripheral surface 28 in the direction opposite the direction of intended band wheel rotation. Slot 64 is defined by slanting rear wall 96, vertical side wall 98 and front wall 94 which is curved so that wire 46 assumes a gradual curvature in its excursion along front wall 94 from anchor arrangement 54.

Once assembled, exemplary replaceable surface band wheel 12 has a contact surface diameter 70 of approximately 16 inches as desired. After a period of wear, wire 46 of wire surface 30 may be replaced simply by removing flange 32 and cap screw 66 to release first end 52 of wire 46 and then unwrapping wire 46 from peripheral surface 28. Thereafter, a new wire 46 may be installed to lie in helical groove 48 in the manner hereinbefore described.

It will be appreciated by those skilled in the art that, by applying the foregoing teachings, a wire having a square, rectangular or other cross section could be employed in an appropriate groove in place of the preferred round wire 46. It will also be appreciated by those skilled in the art that V-shaped helical groove 48 of the preferred embodiment could have a square, rectangular or other cross sectional shape and may be of a pitch which eliminates resulting spaces 62 between wraps of wire 46 without departing from the scope of the present invention.

It will further be appreciated by those skilled in the art that the manner of securing wire 46 in place on peripheral surface 28 may be varied and that variances in the pitch of helical groove 48, or the cutting depth or other changes or variations in the preferred embodiment, may be made without departing from the scope and nature of the present invention as defined in the appended claims. Specifically it will be appreciated that more than one helical groove may be machined in the band wheel peripheral surface, with one elongated member lying in each helical groove. Of course, under such construction there would preferrably be one anchor arrangement for each elongated member.

I claim:

1. A replaceable surface band wheel for a band saw comprising:
   a rotatably mounted disk shaped body having an essentially cylindrical peripheral surface, a front face and a rear edge, said peripheral surface having formed therein at least one groove;
   at least one elongated member having first and second ends and positioned on said peripheral surface to lie in said at least one groove;
   a flange extending radially outwardly from said rear edge of said disk shaped body and partially overlying said peripheral surface thereby slidably retaining said second end of said at least one elongated member;

anchoring means for securing said first end of said at least one elongated member, said flange and said anchoring means for holding said at least one elongated member in said at least one groove on said peripheral surface.

2. A replaceable surface band wheel, as claimed in claim 1, wherein said at least one groove formed in said peripheral surface comprises a helical groove.

3. A replaceable surface band wheel, as claimed in claim 2, wherein said helical groove comprises a V-shaped helical groove.

4. A replaceable surface band wheel, as claimed in claim 2, wherein said helical groove is continuous, extending from said front face of said disk shaped body across said peripheral surface to said rear edge of said disk-shaped body.

5. A replaceable surface band wheel, as claimed in claim 1, wherein said at least one elongated member comprises a wire, said wire wrapped around said peripheral surface to lie in said at least one groove, said wire having cross sectional dimensions sufficient to insure that said wire extends partially above said peripheral surface when positioned in said at least one groove.

6. A replaceable surface band wheel, as claimed in claim 5, wherein said wire comprises a round wire.

7. A replaceable surface band wheel, as claimed in claim 1, wherein said flange comprises a ring shaped body having an axially extending leg, said leg of said flange extending substantially parallel to said peripheral surface from said rear edge of said disk shaped body toward said front face of said disk shaped body above a portion of said peripheral surface.

8. A replaceable surface band wheel, as claimed in claim 7, wherein said flange is removable from said rear edge of said disk shaped body, said leg of said flange being positioned over said second end of said at least one elongated member when said flange is connected to said rear edge of said disk-shaped body so as to slidably retaining said second end of said at least one elongated member in said at least one groove.

9. A replaceable surface band wheel, as claimed in claim 1, wherein said anchoring means is connected to said disk shaped body adjacent said peripheral surface on said front face.

10. A replaceable surface band wheel as claimed in claim 9, wherein said anchoring means comprise an adjustable clamp having a threaded section with a head and a base section, said adjustable clamp clamping said first end of said at least one elongated member between said head of said threaded section and said base section to hold said first end of said at least one elongated member immovable.

11. A replaceable surface band wheel as claimed in claim 2 wherein said helical groove is formed to progress from said front face of said peripheral surface starting at a point adjacent said anchoring means, across said peripheral surface in a direction opposite to the direction of band wheel rotation, to said flange at said rear edge of said peripheral surface.

12. A replaceable surface band wheel as claimed in claim 1 wherein a slot is formed in said front face of said disk-shaped body adjacent to each of said anchoring means said slot communicating with said at least one groove said front face of said band wheel so that when said at least one elongated member is positioned in said at least one groove on said peripheral surface, said at least one elongated member extends through said slot to said anchoring means.

13. A replaceable surface band wheel as claimed in claim 4 wherein said helical groove has a pitch and depth selected to provide segments of said peripheral surface between adjacent circumferential excursions of said helical groove.

14. A replaceable surface band wheel as claimed in claim 5 wherein said wire has cross sectional dimensions such that when said wire is wrapped to lie in said at least one groove, spaces are left between adjacent wraps of wire, said spaces for temporarily receiving chips and scale during cutting operations.

15. A replaceable surface band wheel for a band saw comprising:
 a rotatably mounted disk-shaped body having an essentially cylindrical peripheral surface, a front face and a rear edge, said peripheral surface having formed therein a helical groove;
 an elongated member having first and second ends and positioned on said peripheral surface to lie in said helical groove;
 anchoring means for securing said first end of said elongated member adjacent said front face of said disk-shaped body;
 a flange extending radially outwardly from said rear edge of said disk-shaped body and partially overlying said peripheral surface thereby slidably retaining said second end of said elongated member adjacent said rear edge of said disk-shaped body, said anchoring means and said flange for holding said elongated member in said helical groove on said peripheral surface.

16. A replaceable surface band wheel, as claimed in claim 15, wherein said helical groove comprises a V-shaped helical groove.

17. A replaceable surface band wheel, as claimed in claim 15, wherein said helical groove is continuous extending from said front face of said disk shaped body across the peripheral surface to said rear edge of said disk-shaped body.

18. A replaceable surface band wheel, as claimed in claim 15, wherein said elongated member comprises a wire, said wire wrapped around said peripheral surface to lie in said helical groove, said wire having cross-sectional dimensions sufficient to ensure that said wire extends partially above said peripheral surface when positioned in said helical groove.

19. A replaceable surface band wheel, as claimed in claim 15, wherein said wire comprises a round wire.

20. A replaceable surface band wheel, as claimed in claim 19, wherein said flange comprises a ring-shaped body having an axially expanding leg, said leg extending substantially parallel to said peripheral surface from said rear edge of said disk-shaped body toward said front face of said disk-shaped body above a portion of said peripheral surface.

21. A replaceable surface band wheel, as claimed in claim 20, wherein said flange is removable from said rear edge of said disk shaped body, said leg of said flange being positioned over said second end of said elongated member when said flange is connected to said rear edge of said disk-shaped body, thereby slidably retaining said second end of said elongated member in said helical groove.

22. A replaceable surface band wheel, as claimed in claim 15, wherein said anchoring means is connected to said disk-shaped body adjacent said peripheral surface on said front face.

23. A replaceable surface band wheel, as claimed in claim 22, wherein said anchoring means comprises an adjustable clamp having a threaded section with a head and a base section, said adjustable clamp clamping said first end of said elongated member between said head of said threaded section and said base section to hold said first end of said elongated member immovable.

24. A replaceable surface band wheel, as claimed in claim 15, wherein said helical groove is formed to progress from said front face of said peripheral surface starting at a point adjacent said anchoring means, across said peripheral surface in a direction opposite the direction of band wheel rotation, to said flange at said rear edge of said peripheral surface.

25. A replaceable surface band wheel, as claimed in claim 15, wherein a slot is formed in said front face of said disk-shaped body adjacent said anchoring means, said slot communicating with said helical groove at said front face of said band wheel so that when said elongated member is positioned in said helical groove on said peripheral surface, said elongated member extends through said slot to said anchoring means.

26. A replaceable surface band wheel as claimed in claim 15, wherein said helical groove has a pitch and depth selected to provide segments of said peripheral surface between adjacent circumferential excursions of said helical groove.

27. A replaceable surface band wheel as claimed in claim 26, wherein said elongated member has cross-sectional dimensions such that when said elongated member is wrapped to lie in said helical groove, spaces are left between adjacent wraps of said elongated member, said spaces for temporarily receiving chips and scale during cutting operations.

28. A replaceable surface band wheel for a band saw comprising:
a rotatably mounted disk-shaped body having an essentially cylindrical peripheral surface, a front face and rear edge, said peripheral surface having formed therein a plurality of helical grooves;
a plurality of elongated members each having first and second ends, each of said plurality of elongated members positioned on said peripheral surface to lie in a respective one of said plurality of helical grooves;
anchoring means for securing said first ends of said plurality of elongated members;
a flange extending radially outwardly from said rear edge of said disk-shaped body and partially overlying said peripheral surface thereby slidably retaining said second ends of said plurality of elongated members, said anchoring means and said flange holding said plurality of elongated members in said plurality of helical grooves on said peripheral surface.

29. A replaceable surface band wheel, as claimed in claim 28, wherein said plurality of helical grooves formed in said peripheral surface comprise V-shaped helical grooves.

30. A replaceable surface band wheel, as claimed in claim 28, wherein said plurality of helical grooves are continuous, each extending from said front face of said disk-shaped body, across said peripheral surface to said rear edge of said disk-shaped body.

31. A replaceable surface band wheel, as claimed in claim 28, wherein said plurality of elongated members comprise a plurality of wires, each of said wires being wrapped around said peripheral surface to lie in a respective one of said plurality of helical grooves.

32. A replaceable surface band wheel, as claimed in claim 28, wherein said plurality of elongated members have cross sectional dimensions sufficient to ensure that said plurality of elongated members extend partially above said peripheral surface when positioned to lie in said plurality of helical grooves.

33. A replaceable surface band wheel, as claimed in claim 32, wherein said plurality of elongated members comprise round wires, said round wires having cross sectional dimensions defined by respective diameters of said round wires.

34. A replaceable surface band wheel, as claimed in claim 28, wherein said flange comprises a ring-shaped body having a axially extending leg, said leg of said flange extending substantially parallel to said peripheral surface from said rear edge of said disk-shaped body towards said front face of said disk-shaped body above a portion of said peripheral surface.

35. A replaceable surface band wheel, as claimed in claim 34, wherein said flange is removable from said rear edge of said disk-shaped body, said leg of said flange being positioned over said second end of said elongated members when said flange is connected to said rear edge of said disk-shaped body so as to slideably retain said second ends of said elongated members in said plurality of grooves.

36. A replaceable surface band wheel, as claimed in claim 28, wherein said anchoring means are connected to said disk-shaped body adjacent said peripheral surface on said front face, there being one anchoring means for each of said plurality of elongated members.

37. A replaceable surface band wheel, as claimed in claim 36, wherein said anchoring means comprises a plurality of adjustable clamps, each of said adjustable clamps having a threaded section with a head and a base section, said adjustable clamps clamping said first ends of said plurality of elongated members between said head of said threaded section and said base section to hold said first ends of said plurality of elongated members immovable.

38. A replaceable surface band wheel as claimed in claim 28, wherein said plurality of helical grooves are formed to progress from said front face of said peripheral surface, across said peripheral surface in a direction opposite to the direction of band wheel rotation, to said flange at said rear edge of said peripheral surface.

39. A replaceable surface band wheel as claimed in claim 28, wherein slots are formed within said front face of said disk-shaped body adjacent to each of said anchoring means, each of said slots communicating with one of said plurality of grooves at said front face of said band wheel so that when each of said plurality of elongated members is positioned in a respective one of said plurality of grooves on said peripheral surface, each of said plurality of elongated members extends through one of said slots to one of said anchoring means.

40. A replaceable surface band wheel as claimed in claim 28, wherein each of said plurality of helical grooves has a pitch and depth selected to provide segments of said peripheral surface between adjacent circumferential excursions of said plurality of helical grooves.

41. A replaceable surface band wheel as claimed in claim 40, wherein said plurality of elongated members have cross sectional dimensions such that when said plurality of elongated members are wrapped to lie in said plurality of helical grooves, spaces are left between adjacent wraps of said plurality of elongated members, said spaces for temporarily receiving chips and scale during cutting operations.

* * * * *

UNITED STATES PATENT OFFICE
CERTIFICATE OF CORRECTION

Patent No. 4,027,568   Dated June 7, 1977

Inventor(s) Charles E. Cleland

It is certified that error appears in the above-identified patent and that said Letters Patent are hereby corrected as shown below:

Column 2, line 28, "whees" should read --wheels--.

Column 5, line 64, "roove" should read --groove--.

Column 7, line 12, "with45°" should read --with 45°--.

Column 10, line 53, "19" should read --15--.

Signed and Sealed this

Eighth Day of November 1977

[SEAL]

Attest:

RUTH C. MASON
Attesting Officer

LUTRELLE F. PARKER
Acting Commissioner of Patents and Trademarks